United States Patent
Islam et al.

(10) Patent No.: US 11,039,469 B2
(45) Date of Patent: Jun. 15, 2021

(54) DIFFERENT METHODS FOR PRACH AND PUSCH SEPARATION IN NR

(71) Applicant: QUALCOMM Incorporated, San Diego, CA (US)

(72) Inventors: Muhammad Nazmul Islam, Littleton, MA (US); Bilal Sadiq, Basking Ridge, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 16/147,520

(22) Filed: Sep. 28, 2018

(65) Prior Publication Data
US 2019/0110313 A1    Apr. 11, 2019

Related U.S. Application Data

(60) Provisional application No. 62/570,065, filed on Oct. 9, 2017.

(51) Int. Cl.
  *H04W 74/00*    (2009.01)
  *H04W 74/08*    (2009.01)
  (Continued)

(52) U.S. Cl.
  CPC ......... *H04W 74/006* (2013.01); *H04L 1/0013* (2013.01); *H04L 5/0007* (2013.01);
  (Continued)

(58) Field of Classification Search
  CPC ............ H04W 74/006; H04W 74/0833; H04L 5/0053; H04L 27/2602; H04L 5/0007;
  (Continued)

(56) References Cited

U.S. PATENT DOCUMENTS

2008/0095254 A1*  4/2008  Muharemovic ....... H04L 5/0053
                                                                   375/260
2008/0316961 A1* 12/2008  Bertrand ............... H04L 5/0051
                                                                   370/329
(Continued)

FOREIGN PATENT DOCUMENTS

WO    2017014715 A1    1/2017
WO    2017031725 A1    3/2017

OTHER PUBLICATIONS

International Search Report and Written Opinion—PCT/US2018/053769—ISA/EPO—dated Jan. 16, 2019.
(Continued)

*Primary Examiner* — Will W Lin
(74) *Attorney, Agent, or Firm* — Nerrie M. Zohn

(57) ABSTRACT

To synchronize an apparatus during wireless communication, an apparatus may transmit a Random Access Channel (RACH) preamble sequence to a base station. However, care must be taken to prevent the RACH preamble sequence from causing inadequate levels of interference in other uplink resources. In an aspect of the disclosure, a method, a computer-readable medium, and an apparatus are provided. The apparatus may be configured to determine, based on a RACH subcarrier spacing and a data tone subcarrier spacing, a number of RACH tones allocated for a transmission of a RACH preamble sequence. In this manner, the apparatus may ensure that adequate uplink resources are allocated to prevent interference.

37 Claims, 13 Drawing Sheets

(51) Int. Cl.
  *H04L 1/00* (2006.01)
  *H04L 27/26* (2006.01)
  *H04L 5/00* (2006.01)

(52) U.S. Cl.
  CPC ........ *H04L 5/0053* (2013.01); *H04L 27/2602* (2013.01); *H04L 27/2607* (2013.01); *H04L 27/2613* (2013.01); *H04L 27/2692* (2013.01); *H04W 74/0833* (2013.01)

(58) Field of Classification Search
  CPC ............... H04L 1/0013; H04L 27/2607; H04L 27/2613; H04L 27/2692
  See application file for complete search history.

(56) References Cited

U.S. PATENT DOCUMENTS

| | | | | |
|---|---|---|---|---|
| 2009/0046629 | A1* | 2/2009 | Jiang | H04J 13/0062 370/328 |
| 2010/0172299 | A1* | 7/2010 | Fischer | H04W 74/002 370/328 |
| 2016/0373222 | A1* | 12/2016 | Pralea | H04L 27/2636 |
| 2017/0094689 | A1* | 3/2017 | Lin | H04L 27/2613 |
| 2017/0238344 | A1* | 8/2017 | McGowan | H04L 5/0007 370/329 |
| 2018/0077696 | A1* | 3/2018 | Lee | H04W 72/048 |
| 2019/0281624 | A1* | 9/2019 | Kim | H04L 27/26 |
| 2020/0015285 | A1* | 1/2020 | Shin | H04L 5/0053 |
| 2020/0067621 | A1* | 2/2020 | Hu | H04J 13/0062 |
| 2020/0068620 | A1* | 2/2020 | Kim | H04W 74/006 |

OTHER PUBLICATIONS

Qualcomm Incorporated: "Remaining Details on PRACH Formats," 3GPP Draft; R1-1718531 Remaining Details on PRACH Formats, 3rd Generation Partnership Project (3GPP), Mobile Competence Centre; 650, Route Des Lucioles; F-06921 Sophia-Antipolis Cedex; France, vol. RAN WG1, No. Prague; Oct. 9-13, 2017, Oct. 8, 2017, XP051341713, 21 pages, Retrieved from the Internet: URL: http://www.3gpp.org/ftp/Meetings_3GPP_SYNC/RAN1/Docs/ [retrieved on Oct. 8, 2017].

* cited by examiner

DIFFERENT METHODS FOR PRACH AND PUSCH SEPARATION IN NR

CROSS-REFERENCE TO RELATED APPLICATION(S)

This application claims the benefit of U.S. Provisional Application Ser. No. 62/570,065, entitled "DIFFERENT METHODS FOR PRACH AND PUSCH SEPARATION IN NR" and filed on Oct. 9, 2017, which is expressly incorporated by reference herein in its entirety.

BACKGROUND

Technical Field

The present disclosure relates generally to communication systems, and more particularly, to implementations of a Random Access Channel (RACH) for uplink synchronization.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

More specifically, user equipment (UE) and a base station are configured to perform a RACH process in order to provide uplink (UL) synchronization between the UE and the base station. To do this, RACH preamble sequences are transmitted by the UE. However, RACH preamble sequences can present significant interference problems for uplink signals in other UL channels. This is a particular problem given the subcarrier spacing of 5G/NR frame structures.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Current formats for Physical RACH (PRACHs) include an allocation of guard tones to prevent interference with other UL channels. In some implementations however, the guard tones currently used in current PRACH formats may not provide sufficient guard spacing. For instance, guard bands should generally be at least one subcarrier in bandwidth in order to prevent the RACH preamble sequence from interfering with other UL channels. However, 5G/NR frame structures are being introduced with larger and larger subcarrier spacings. Therefore additional precautions need to be taken in order to prevent a RACH preamble sequence from causing unacceptably high interference in other uplink resources.

In an aspect of the disclosure, a method, a computer-readable medium, and an apparatus are provided. The apparatus may be configured to determine, based on a RACH subcarrier spacing and a data tone subcarrier spacing, a number of RACH tones allocated for a transmission of a RACH preamble sequence.

In one aspect, the apparatus is configured to determine, based on a subcarrier spacing within RBs of RACH resources and based on a RACH tone spacing within each subcarrier of the RBs, a number of RACH tones to allocate to the RACH resources. For example, the apparatus may receive a PRACH format from a base station. Nevertheless, given the subcarrier spacing of the RBs and the RACH tone spacing, the PRACH format may not provide an adequate amount of guard tones.

Accordingly, the apparatus may be configured to determine a number of RACH tones to allocate to the RACH resource based on the subcarrier spacing and the RACH tone spacing of resource blocks (RBs) that provide the RACH resources. The apparatus may transmit the RACH preamble sequence in the RACH resources within the determined number of RACH tones and thereby implement a RACH process for UL synchronization.

In another aspect, the apparatus may determine, based on a subcarrier spacing within RBs of RACH resources and based on a RACH tone spacing within each subcarrier of the RBs, a number of RACH tones for rate matching or puncturing in association with the RACH resources and uplink data. The number of RACH tones for rate matching or puncturing may be equal to a number of RACH tones of the RACH resources plus x additional RACH tones, where x≥96 for a first subcarrier spacing S1 and x=0 for a second subcarrier spacing S2, where S1>S2. Thus, if the allocation of guard tones is adequate, x is equal to 0 and no additional puncturing or rate matching is provided. However, if the allocation of guard tones is inadequate, x may be equal to or greater than 96 and additional puncturing or rate matching is provided. As explained below, the number 96 ensures that the number of additional RACH tones is equal to at least two subcarriers when larger subcarrier spacings are allocated in the RBs. The apparatus may transmit the RACH preamble sequence in the RACH resources for UL synchronization.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
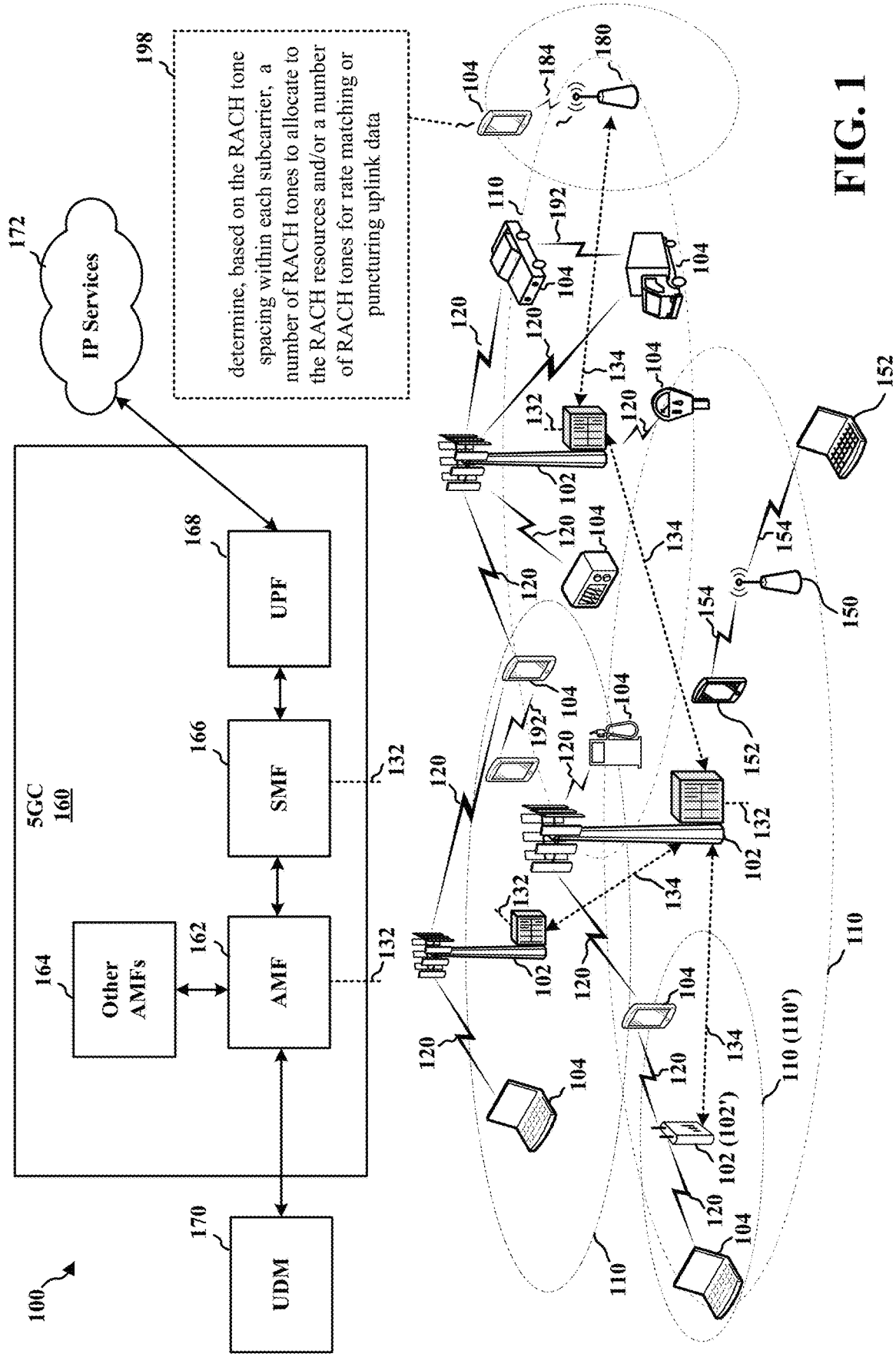
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an 5G Core (5GC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN), Next Generation RAN (NG-RAN)) interface with the 5GC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the 5GC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The 5G Core Network (5GC) 160 may include a Access and Mobility Management Function (AMF) 162, other AMFs 164, a Session Management Function (SMF) 166, and a User Plane Function (UDP) 168. The AMF 162 may be in communication with a Unified Data Management (UDM) 170. The AMF 162 is the control node that processes the signaling between the UEs 104 and the 5GC 160. Generally, the AMF 162 provides QoS flow and session management. All user Internet protocol (IP) packets are transferred through the UPF 168. The UPF 168 provides UE IP address allocation as well as other functions. The UPF 168 is connected to the IP Services 172. The IP Services 172 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the 5GC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As mentioned above, a UE and the base station are configured to perform the RACH process in order to provide UL synchronization between the UE and the base station. However, as discussed below, the RACH preamble sequences used to provide UL synchronization in the PRACH can present significant interference problems for uplink signals in other UL channels. Thus, current formats for PRACH include an allocation of guard tones to prevent interference with other UL channels. In some implementations however, the guard tones currently used in current PRACH formats may not provide sufficient guard spacing. For instance, guard bands should generally be at least one subcarrier in bandwidth in order to prevent the RACH preamble sequence from interfering with other UL channels. However, 5G/NR frame structures are being introduced with larger and larger subcarrier spacings. Therefore additional precautions need to be taken in order to prevent a RACH process from causing unacceptably high interference.

Referring again to FIG. 1, in certain aspects, the UE 104 may be configured to determine, based on the RACH tone spacing within each subcarrier, a number of RACH tones to allocate to the RACH resources and/or a number of RACH tones for rate matching or puncturing uplink data (198), e.g., as described below in connection with any of FIGS. 2A-13.

In one aspect, the UE 104 is configured to determine, based on a subcarrier spacing within RBs of RACH resources and based on a RACH tone spacing within each subcarrier of the RBs, a number of RACH tones to allocate to the RACH resources. For example, the UE 104 may receive a PRACH format from the base station 180. However, given the subcarrier spacing of the RBs and the RACH tone spacing, the allocated guard tones may not provide sufficient spacing so as to prevent interference between the RACH preamble sequence in the PRACH and uplink data in adjacent RBs.

Accordingly, the UE 402 may be configured to determine a number of RACH tones to allocate to the RACH resources. For example, the number of guard tones may be equal to the determined number of RACH tones minus the RACH preamble sequence and the number of guard tones within the RACH resources may increase as the subcarrier spacing increases. In one aspect, the determined number of RACH tones is $N_1$ when the subcarrier spacing is $S_1$ and is $N_2$ when the subcarrier spacing is $S_2$, where $N_1 > N_2$ and $S_1 > S_2$.

As mentioned above, the determined number of RACH tones may be based on the subcarrier spacing and the RACH tone spacing of RBs that provide the RACH resources. In one implementation, the subcarrier spacing is $S_s$ and the RACH tone spacing $S_t$, where $S_s > S_t$. For example, the RACH tone spacing St may be equal to 1.25 kHz or 5 kHz. The subcarrier spacing of some subframes provided by 5G/NR may be equal to 15 kHz, 30 kHz, 60 kHz, and 120 kHz. The determined number of RACH tones allocated for the RACH resources is approximately equal to $12*N_{RB}*S_s/S_t$, where $N_{RB}$ is the number of RBs within the allocated RACH resources, and 12 is the number of subcarriers per RB. In one aspect, $N_{RB} \leq 5$ and may be an integer. Thus, the RACH resources are provided to fit within less than 6 RBs, unlike the configuration described above. The UE 104 may transmit the RACH preamble sequence in the RACH resources within the determined number of RACH tones in order to implement a RACH process for UL synchronization.

In another aspect, the number of RACH tones allocated may be the same regardless of the subcarrier spacing. Consequently, both the number of guard tones and the RACH preamble sequence may remain the same regardless of the subcarrier spacing. However, the number of guard tones may not provide large enough guard bands given some subcarrier spacings. The UE 104 may thus determine, based on a subcarrier spacing within RBs of RACH resources and based on a RACH tone spacing within each subcarrier of the RBs, a number of RACH tones for rate matching or puncturing in association with the RACH resources and uplink data. In particular, the number of RACH tones for rate matching or puncturing being equal to a number of RACH tones of the RACH resources plus x additional RACH tones. In this manner, the x additional RACH tones provided by rate matching or puncturing may provide adequate spacing.

For example, the number of RACH tones allocated to the RACH resources may have an adequate number of guard tones and thus x=0. However, with larger subcarrier spacings (e.g., 60 kHz), the number of guard tones may be inadequate. Thus, $x \geq 96$ for these larger subcarrier spacings. As explained in further detail below, 96 RACH tones is the number of RACH tones needed to provide 2 subcarriers worth of guard spacing given a RACH tone spacing of 1.25 kHz and a subcarrier spacing of 60 kHz.

Figures 2A, 2B:
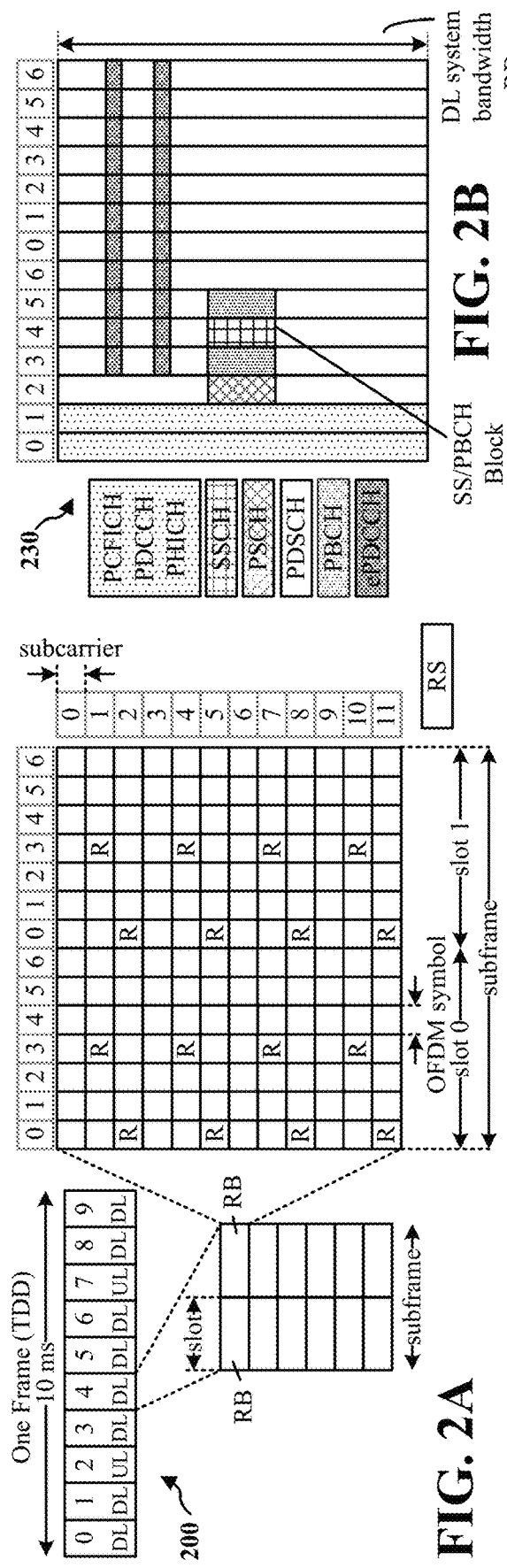
FIGS. 2A, 2B, 2C, and 2D are diagrams illustrating examples of a DL frame structure, DL channels within the DL frame structure, an UL frame structure, and UL channels within the UL frame structure, respectively.
Figures 2C, 2D:
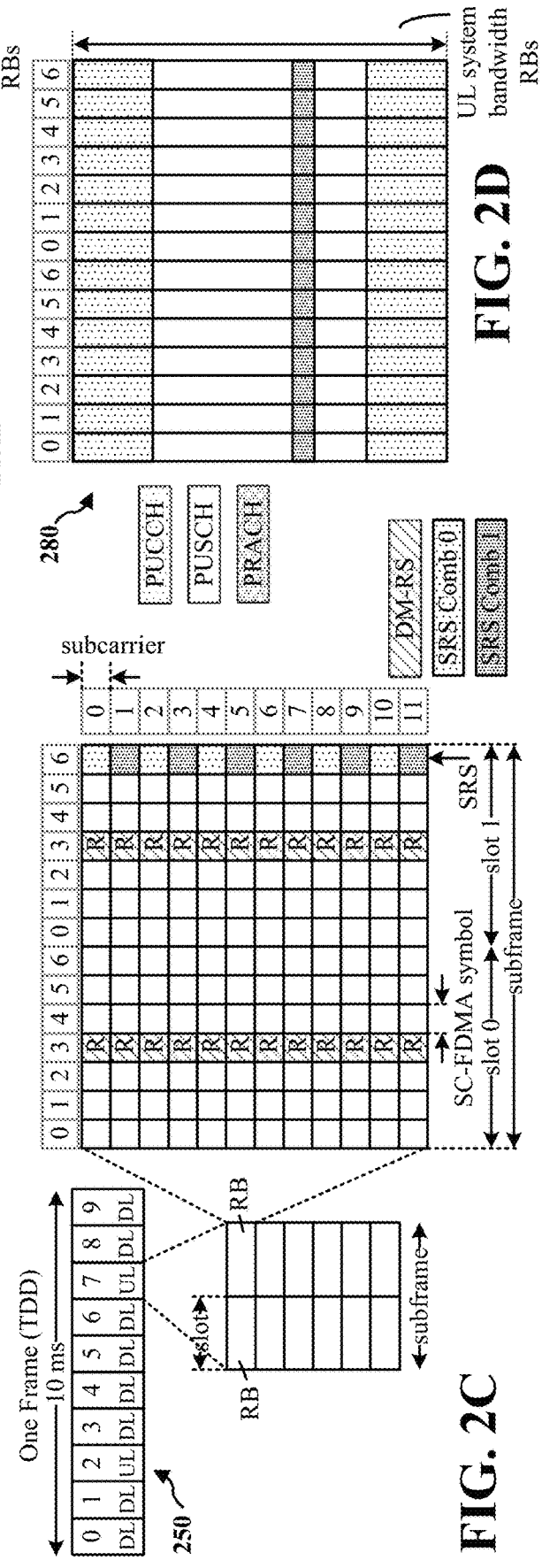

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu * 15$ kKz, where μ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
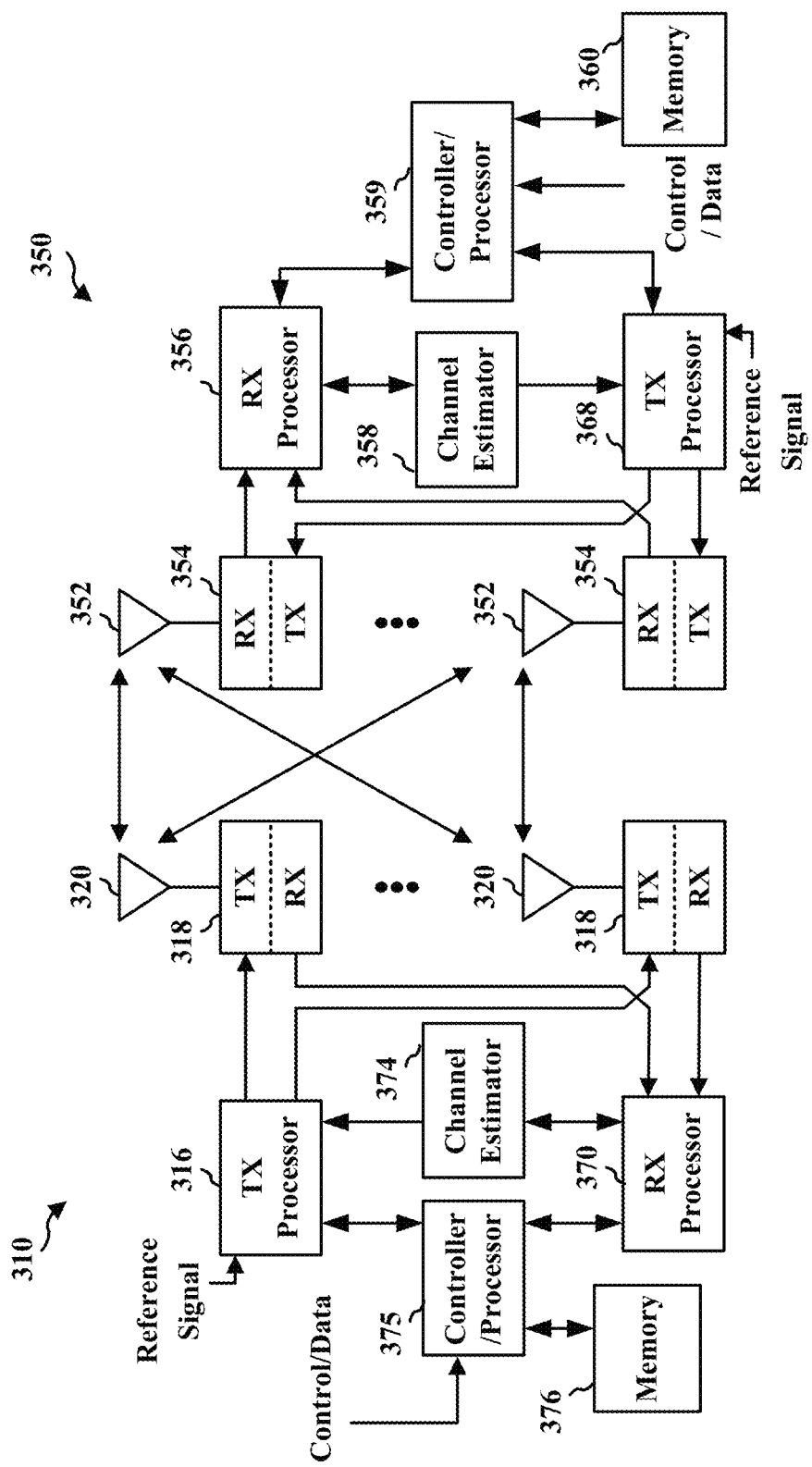
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
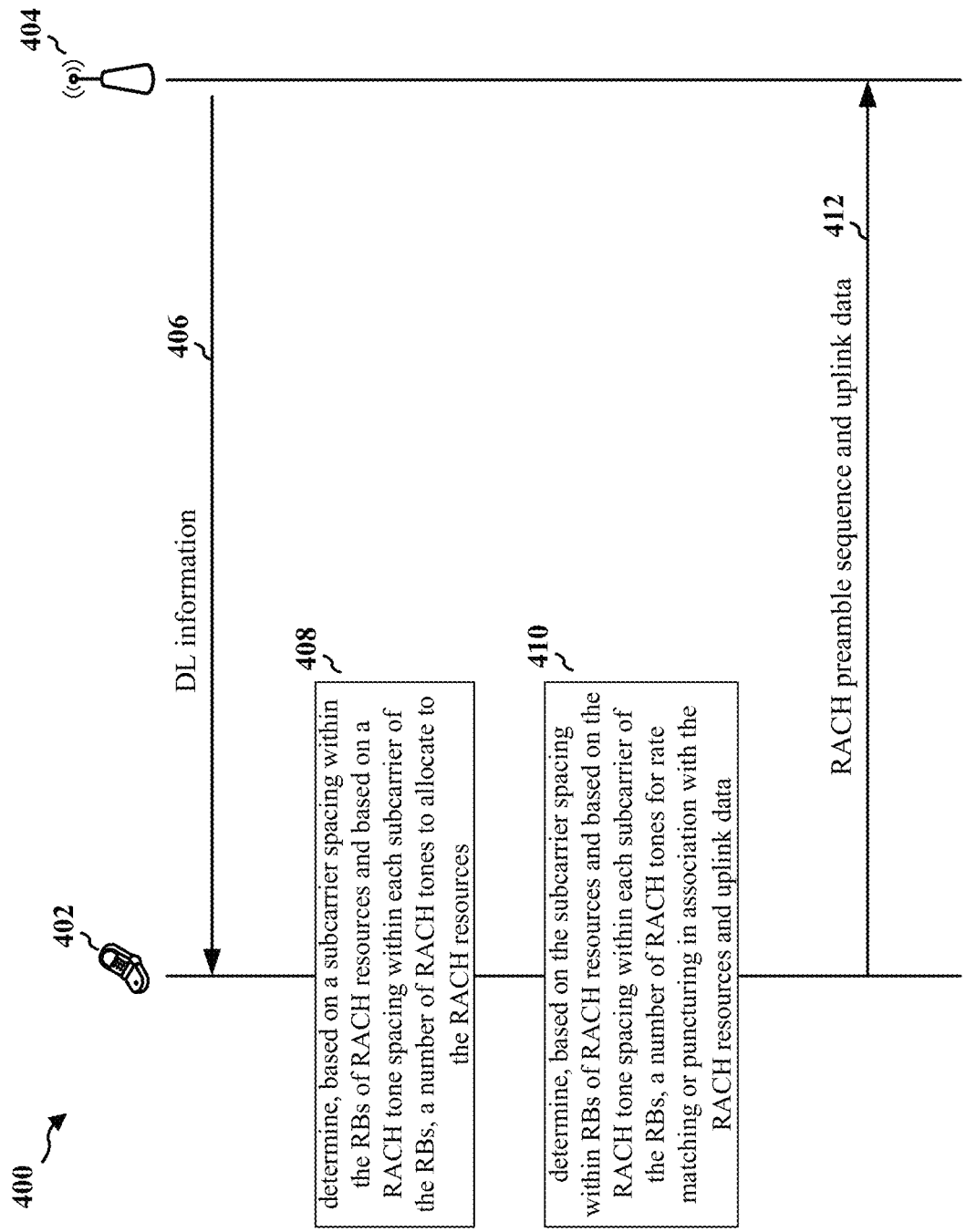
FIG. 4 is a call flow diagram between a UE and a base station.

FIG. 4 illustrates is a call flow diagram 400 illustrating an example of UL synchronization between a UE 402 (e.g., UE 104, 350, the apparatus 1002/1002', the apparatus 1202/1202') and a base station 404 (e.g., UE 102, 180, 310, 1050, 1250). In some aspects, the UE 402 and the base station 404 may perform the procedures as part of a RACH process. For example, different implementations of the procedures described below may be performed during message 1, message 2, or message 3 or message 4 of a RACH process, whether contention based or contention free.

As explained in further detail below, the UE 402 and the base station 404 may be configured to perform the RACH process given the various frame structures that may be utilized in 5G NR. As shown in FIG. 4, the base station 404 may transmit and the UE 402 may receive DL information indicating a number of RACH tones to allocated to RACH resources at 406. For example, the base station 404 may determine a PRACH format that should be used by UEs given the current frame structure being implemented in the cell and transmit a PRACH format number that identifies the PRACH format to the UE 402. The base station 404 may then transmit and the UE 402 may receive the DL information indicating the PRACH format number, which the UE 402 may then use to determine the number of RACH tones allocated to RACH resources, as explained in further detail below.

In one implementation, the base station 404 may use one or more bits within a Radio Network Temporary Identifier (RNTI), such as a Cell RNTI (C-RNTI) to indicate the PRACH format. The DL information may also include a root sequence index that indicates RACH preamble sequences available in the cell served by the base station 404. In some implementations, the base station 404 may transmit the DL information and the UE 402 may receive the DL information through one or more of a PSS, a SSS, a PBCH, DMRS of the PBCH, remaining minimum system information (RMSI), other system information (OSI), a PDCCH, a RRC message, a handover message, or a SIB.

Upon receiving the DL information, the UE 402 may determine, based on a subcarrier spacing within the RBs of RACH resources and based on a RACH tone spacing within each subcarrier of the RBs, a number of RACH tones to allocate to the RACH resources at 408. The UE 402 may select one of the RACH preamble sequences available within the cell for transmission to the base station 404. The sequence length may correspond with a first number of the RACH tones used to transmit the RACH preamble sequence in the PRACH. However, given the variety of frame structures available within 5G NR, the UE 402 may also take sufficient precaution in order to prevent the RACH tones from interfering with other uplink data transmitted within other RBs adjacent to the PRACH. As explained in further detail below, frame structures may be available in 5G NR with subcarrier spacings of 15 kHz, 30 kHz, 60 kHz, and 120 kHz. However, RACH preamble sequences are generally cyclical sequences, such as Zadoff-Chu sequences, that maintain orthogonality between multiple UEs within a cell of a given size. Thus, the sequence lengths for the RACH preamble sequences may remain fixed for various subcarrier spacings.

In some implementations, the UE 402 may determine a second number of RACH tones to include as RACH guard tones based on the RACH tone spacing and the subcarrier spacing of the RBs. The second number of guard RACH tones may be provided at the upper and lower edges of the PRACH to prevent interference with other uplink data transmitted by other UEs (not illustrated) in adjacent bands. Thus, the PRACH may include the RACH preamble sequence and RACH guard tones. More guard tones may be provided as the subcarrier spacing of the RBs increase. N1 may represent the determined number of RACH tones when the subcarrier spacing is S1 and N2 may represent the determined number of RACH tones when the subcarrier spacing is S2, where N1>N2 and S1>$S_2$.

The amount of guard spacing may be determined so that the UL bandwidth of the PRACH fits into a whole number of RBs. For example, the RACH guard tones may be provided for at least 6.5 subcarriers within the RBs of the RACH resources when the subcarrier spacing is S1 (e.g., 60 kHz) and may comprise at least 2 subcarriers within the RBs of the RACH resources when the subcarrier spacing is S2 (e.g., 15 kHz), as explained in further detail below.

In some implementations, however, the guard tones may not provide sufficient guard spacing. Additional techniques may need to be implemented to reduce interference. Also, in still other implementations, the UE 402 may perform a different determination than the determination illustrated at 408, because the number of RACH tones may be fixed for any particular PRACH format regardless of the RACH spacing. Additionally, in some implementations, the base station 404 may allocate uplink data in the RBs and simply dynamically puncture or rate match the PRACH into the RBs. Thus, additionally or alternatively, the UE 402 may determine, based on the subcarrier spacing within RBs of RACH resources and based on the RACH tone spacing within each subcarrier of the RBs, a number of RACH tones for rate matching or puncturing in association with the RACH resources and uplink data at 410.

As 5G/NR provides frames structures with increased subcarriers spacing, rate matching or puncturing may be used by the UE 402 to prevent interference between the PRACH, the PUCCH, and the PUSCH as explained in further detail below. In one implementation, the base station 404 may allocate uplink data from PUCCH and/or PUSCH in the RBs and dynamically puncture or rate match the uplink data with the PRACH into the RBs.

The number of RACH tones for rate matching or puncturing may equal the number of RACH tones of the RACH resources plus x additional RACH tones. Thus, in one aspect, rate matching or puncturing may be provided in the uplink data to include all of the RACH tones in the PRACH plus a spacing of x additional RACH tone(s) outside the PRACH.

For example, in some implementations, the number of RACH tones in the PRACH may be fixed regardless of the subcarrier spacing. The PRACH may however be provided to fit and provide an adequate amount of RACH guard tones within RBs given the subcarrier spacing S2 (e.g., 15 kHz). In this case, the UE 402 determines that x=0 since no additional tones are needed. However, the PRACH may only fit partially within the RBs given the subcarrier spacing S1 (e.g., 60 kHz) so that the uplink data will remain in some of the subcarriers of one or more of the RBs even after puncturing or rate matching is provided.

In the case of subcarrier spacing of S2, the fixed number of RACH guard tones may provide insufficient spacing. Generally, interference between the PRACH and the uplink data is maintained within acceptable levels when each of the guard bands at the edges of the PRACH separate the RACH tones (with the RACH preamble sequence) by at least one subcarrier spacing. Thus, together the guard bands should equal to a subcarrier spacing of about two subcarriers. Accordingly, the UE 402 may determine the additional x tones of RACH tones, where x≥96 given the subcarrier spacing S2 (e.g., 96 additional RACH tones given a subcarrier spacing of 60 kHz and a RACH tone spacing of 1.25 kHz).

At 412, the UE 402 may transmit the RACH preamble sequence in the RACH resources and the uplink data to the base station 404. For example, the RACH preamble sequence may be transmitted to the base station within the PRACH, as discussed above. Accordingly, the UL synchronization may be provided between the base station 404 and the UE 402 using the RACH preamble sequence in accordance with RACH procedures for 5G/NR. The rate matched or punctured uplink data may be transmitted concurrently with the RACH preamble sequence. For example, the PRACH may puncture or rate match the uplink data in the PUSCH and/or the PUCCH so that the PRACH is allocated dynamically into the RBs.

Figure 5:
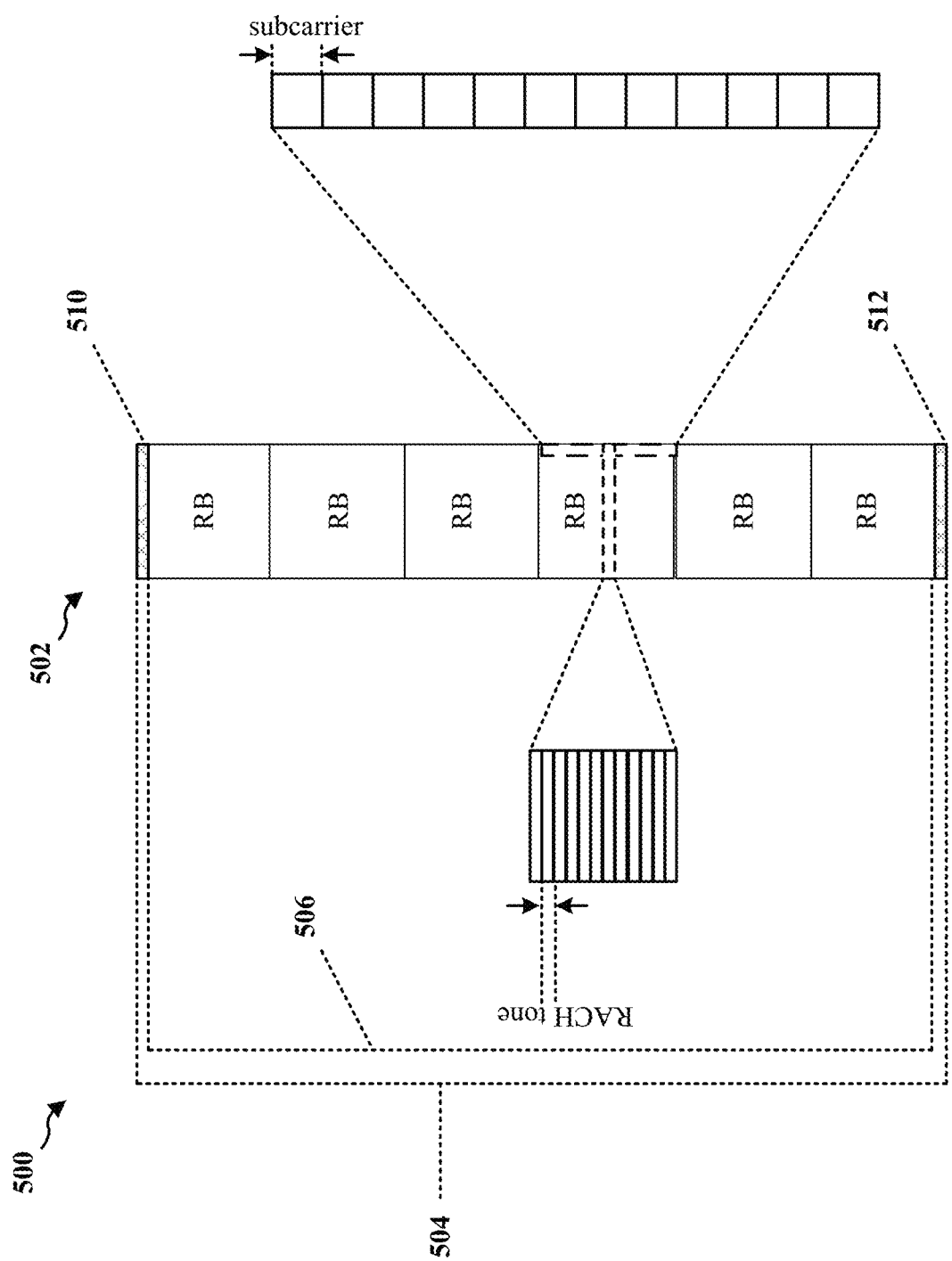
FIG. 5 is a diagram of a Physical Random Access Channel (PRACH).

FIG. 5 illustrates a diagram 500 of an exemplary PRACH 502 provided within a UL bandwidth of 6 consecutive RBs along the frequency domain. As explained above, each RB may extend across 12 subcarriers in the frequency domain. Thus, the UL bandwidth of the PRACH 502 may comprise 72 subcarriers. In this example, the subcarrier spacing is equal to 15 kHz. Accordingly, the UL bandwidth of the PRACH 502 is equal to 1.08 MHz.

As shown in FIG. 5, the PRACH 502 has a resource allocation of RACH tones 504 and 12 of the RACH tones 504 are provided for each subcarrier of the 6 RBs. Furthermore, the RACH tone spacing of the RACH tones 504 is 1.25 kHz. However, only a subset of the RACH tones 504 allocated to the PRACH 502 actually include a RACH preamble sequence 506. In this example, the RACH preamble sequence 506 is provided by 839 of the RACH tones 504.

The UE 402 is configured to generate the RACH preamble sequence 506 and transmit the RACH preamble sequence 506 to the base station 404. The RACH preamble sequence 506 is provided for UL synchronization between the base station 404 and the UE 402. In addition, the PRACH 502 includes an allocation of guard tones 510 at the highest frequencies and an allocation of guard tones 512 at the lowest frequencies, which do not include the RACH preamble sequence 506. This helps reduce interference between the RACH preamble sequence 506 and adjacent subcarriers in other UL channels.

In general, interference between the RACH preamble sequence 506 and adjacent subcarriers is provided at acceptable levels when the frequency spacing provided by the guard tones 510 and the guard tones 512 are each equal to the subcarrier spacing of one subcarrier. The table below describes the tone spacing, sequence length of the RACH preamble sequence 506, and the allocated number of tones 504 of different PRACH formats.

| PRACH Format | Tone Spacing (kHz) | Sequence Length | Total No. of allocated tones |
|---|---|---|---|
| 0 | 1.25 | 839 | 864 |
| 1 | 1.25 | 839 | 864 |
| 2 | 1.25 | 839 | 864 |
| 3 | 1.25 | 839 | 864 |
| 4 | 7.5 | 139 | 144 |

The example described above in FIG. 5 is for PRACH format number 0. The total number of guard tones 510, 512 has been provided so that the PRACH fits precisely into the 6 RBs. Thus, the determined number of RACH tones 504 allocated to the PRACH is approximately equal to $12*N_{RB}*S_s/S_t$, where $N_{RB}$ is the number of RBs within the PRACH, the data tone subcarrier spacing is $S_s$, and the RACH tone spacing is $S_t$. In this example, $N_{RB}$=6, $S_s$=15 kHz, and $S_t$=1.25 kHz. Therefore, 864 of the RACH tones 504 are provided in the PRACH 502.

Since the RACH tone spacing of the 864 RACH tones 504 having a RACH tone spacing of 1.25 kHz are provided in the PRACH 502, the total bandwidth of the RACH tones 504 is equal to 1.08 MHz, which precisely fits the UL bandwidth of the 6 RB that provide the PRACH 502. As mentioned above, the sequence length of the RACH preamble sequence 506 is equal to 839, which is the number of RACH tones needed so that the UE 402 can select from 64 orthogonal Zadoff-Chu sequences and generate the RACH preamble sequence 506 during the RACH process. The PRACH formats described above, however, presume that the frame structure of the frames have a subcarrier spacing of 15 kHz. More specifically, one subcarrier of 15 kHz is equal to 12 of the RACH tones 504 with 1.25 kHz RACH tone spacing. In this example, the number of the guard tones 510 is equal to 13 and the number of the guard tones 512 is equal to 12 (to provide a total number of 25 guard tones 510, 512). Thus, each of the guard bands provided by the guard tones 510, 512 each is at least one subcarrier in length. Accordingly, the UE 402 generates the RACH preamble sequence 506 with the selected RACH preamble sequence so that interference between the RACH preamble sequence 506 and other channels is maintained within acceptable levels for LTE. Note that uplink data may be punctured or rate matched by just the PRACH 502 since the guard tones 510, 512 provide sufficient guard spacing. Thus, the number of additional tones x that would need to be punctured or rate matched outside of the PRACH 502 is equal to zero.

However, 5G NR standards were proposed with frame structures that have subcarrier spacing of 15 kHz, 30 kHz and 60 kHz for frequency bands below 6 GHz and subcarrier spacing of 60 kHz and 120 kHz for frequency bands above 6 GHz.

| PRACH Format | Tone Spacing (kHz) for $\mu = \{0, 1, 2, 3\}$ | Sequence Length |
| --- | --- | --- |
| A0 | $2^\mu * 15$ kKz | 139 |
| A1 | $2^\mu * 15$ kKz | 139 |
| A2 | $2^\mu * 15$ kKz | 139 |
| A3 | $2^\mu * 15$ kKz | 139 |
| B1 | $2^\mu * 15$ kKz | 139 |
| B2 | $2^\mu * 15$ kKz | 139 |
| B3 | $2^\mu * 15$ kKz | 139 |
| B4 | $2^\mu * 15$ kKz | 139 |
| C0 | $2^\mu * 15$ kKz | 139 |
| C2 | $2^\mu * 15$ kKz | 139 |

In this disclosure, UEs (e.g., the UE 402) and the base station (e.g., base station 404) are provided to implement RACH procedures for these PRACH formats given the new frame structures proposed for 5G NR standards. Of significance to this disclosure is that the UE 402 is configured to provide a PRACH in accordance with the above described PRACH formats without interfering with other UL and DL channels, given the new frame structures.

In particular, as the signal characteristics of the RACH tones of the PRACH may be significantly different than the signal characteristics of the PUCCH and the PUSCH, it may be difficult to provide orthogonality between PRACH and either the PUCCH or the PUSCH. Thus, frequency and or temporal spacing is generally provided to prevent collisions. However, the new 5G NR frame structures may define frame structures with large subcarrier spacing (e.g., 60 kHz, 120 kHz) squeezed into tighter and tighter time durations. Accordingly, the UE 402 and the base station 404 implement techniques that prevent collisions and unacceptably high interference between the PRACH, PUSCH, and PUCCH.

Figure 6:
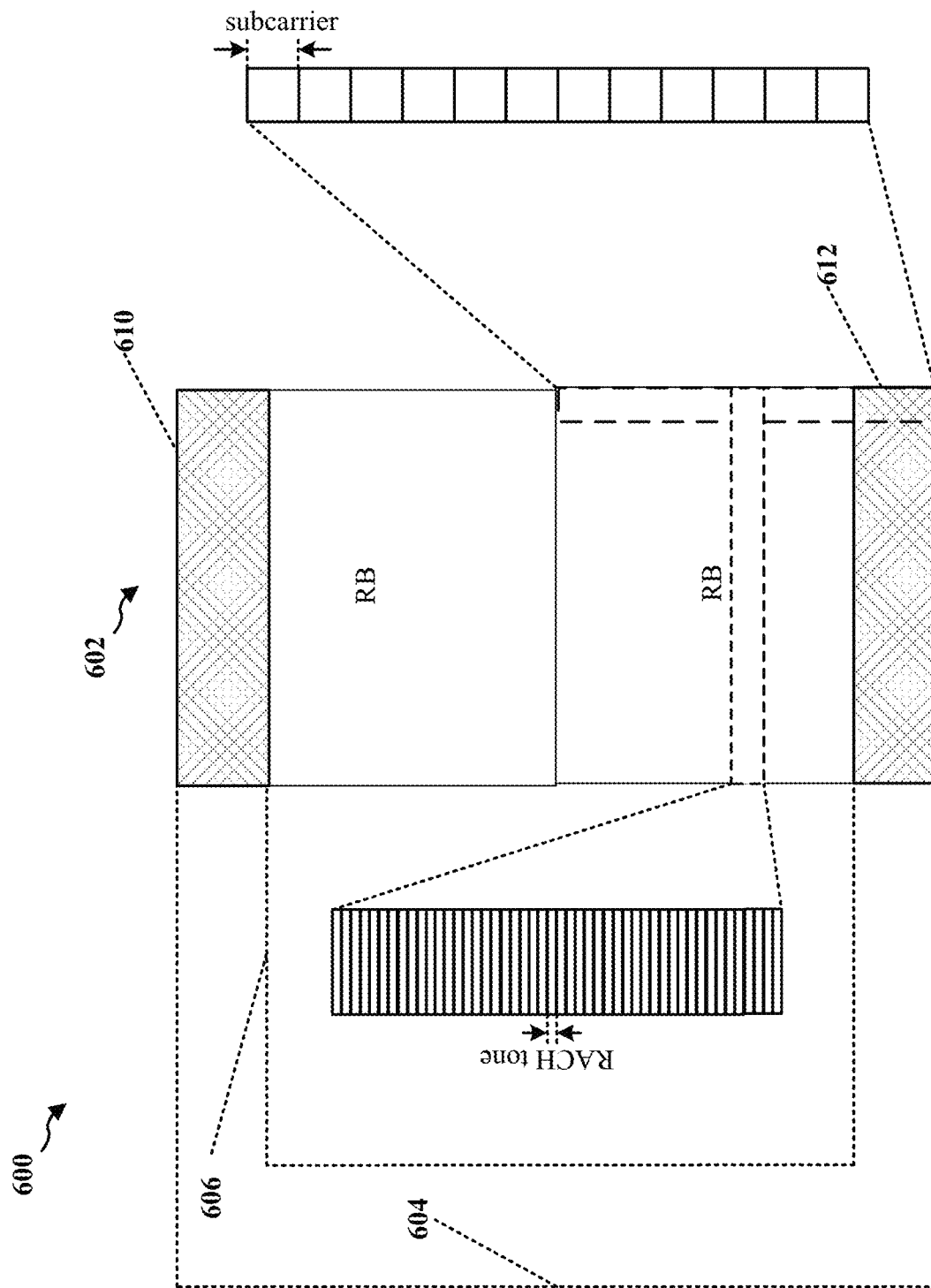
FIG. 6 is a diagram of another PRACH.

FIG. 6 illustrates a diagram 600 of an exemplary PRACH 602 provided within a UL bandwidth of 2 consecutive RBs along the frequency domain. As explained above, each RB extends across 12 subcarriers in the frequency domain. Thus, the UL bandwidth of the PRACH 602 is provided by 24 subcarriers. In this example, the subcarrier spacing is equal to 60 kHz. Accordingly, the UL bandwidth of the PRACH 602 is equal to 1.44 MHz.

As shown in FIG. 6, the PRACH 602 has a resource allocation of RACH tones 604 so that 48 of the RACH tones 604 are provided for each of the 24 subcarriers in the 2 RBs. More specifically, the RACH tone spacing of the RACH tones 604 is 1.25 kHz. However, only a subset of the RACH tones 604 allocated to the PRACH 602 actually include a RACH preamble sequence 606. In this example, the RACH preamble sequence is provided by 839 of the RACH tones 604.

In the example shown in FIG. 6, the UE 402 is configured to generate the RACH preamble sequence 606 so as to transmit the RACH preamble sequence 606 to the base station 404. The RACH preamble sequence 606 is provided for UL synchronization between the base station 404 and the UE 402, given a frame structure that provides the PRACH 602 with the aforementioned bandwidth and subcarriers described above. An allocation of guard tones 610 at the highest frequencies and the allocation of guard tones 612 at the lowest frequencies do not include the RACH preamble sequence 606. This helps to reduce interference between the RACH preamble sequence 606 and adjacent subcarriers in other UL channels.

In general, interference between the RACH preamble sequence 606 and adjacent subcarriers may be acceptably small when the frequency spacing provided by the guard tones 610 and the guard tones 612 are each equal to the subcarrier spacing of one subcarrier. The total number of guard tones 610, 612 has been provided so that the PRACH fits precisely into the 2 RBs. Thus, the determined number of RACH tones 604 allocated to the PRACH 602 is approximately equal to $12*N_{RB}*Ss/St$, where $N_{RB}$ is the number of RBs allocated to the PRACH 602, the data tone subcarrier spacing is $S_s$, and the RACH tone spacing is St. In this example, $N_{RB}=2$, Ss=60 kHz, and St=1.25 kHz. Therefore, 1152 of the RACH tones 604 are provided in the PRACH 602.

Since RACH tones 604 have a RACH tone spacing of 1.25 kHz, the RACH tones 604 have a UL bandwidth of 1.44 MHz, As mentioned above, the sequence length of the RACH preamble sequence 606 is equal to 839, which is the number of RACH tones needed so that the UE 402 can select from 64 orthogonal Zadoff-Chu sequences and generate the RACH preamble sequence 606 during the RACH process. The PRACH formats above, however, presume that the frame structure of the frames have a subcarrier spacing of 60 kHz. In addition, one subcarrier of 60 kHz is equal to 48 of the RACH tones 504 with 1.25 kHz tone spacing. Given that there are 48 RACH tones for each of the 1.25 kHz tones spacing, then 25 guard tones would be equal to 0.52 subcarrier spacing of 60 kHz spacing. Thus, there are only 0.26 subcarrier spacing per guard band, which may not be enough guard band protection.

In this case, 313 of the RACH tones 604 in the PRACH 602 are provided as guard tones 610, 612. This corresponds to a spacing of approximately 6.52 total subcarriers when both guard bands are combined (i.e., approximately 3.51 subcarriers for each of the guard tones 610, 612). Accordingly, the UE 402 may generate the RACH preamble sequence 506 with the selected RACH preamble sequence 606 so that interference between the RACH preamble sequence 606 and other channels is maintained within acceptable levels, e.g., for LTE. Note that uplink data may be punctured or rate matched by just the PRACH 602 because the guard tones 610, 612 provide sufficient guard spacing. Thus, the number of additional tones x that would need to be punctured or rate matched outside of the PRACH 602 is equal to zero.

Figure 7:
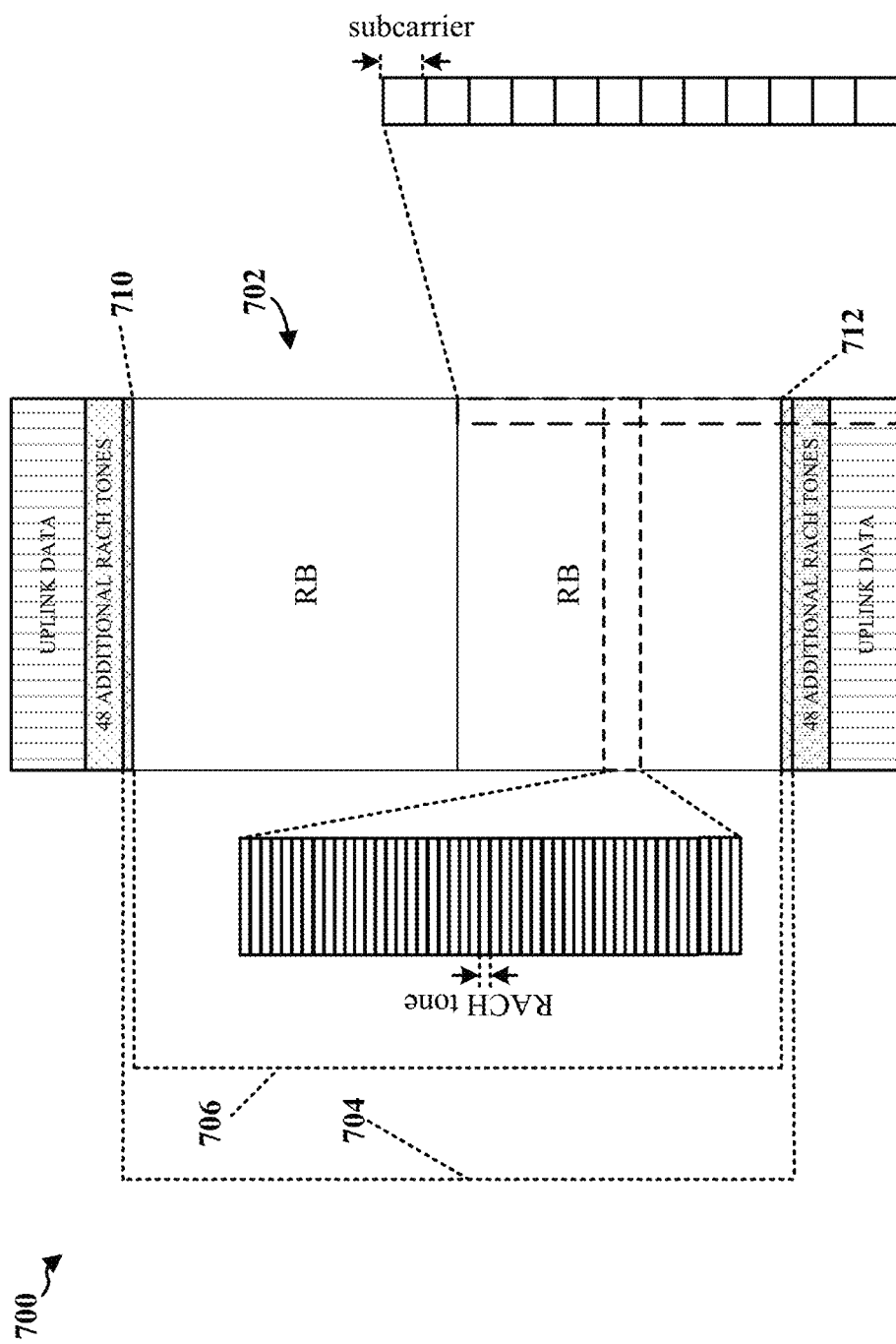
FIG. 7 is a diagram of still another PRACH.

FIG. 7 illustrates a diagram 700 of an example PRACH 702 provided with the same sequence length and the same number of allocated tones as the PRACH 502 described above with respect to FIG. 5 within a UL bandwidth of 2 consecutive RBs along the frequency domain. The RBs include 12 subcarriers in the frequency domain. In this example, the subcarrier spacing of the subcarriers is 60 kHz, similar to FIG. 6. Therefore, the PRACH 702 has a UL bandwidth of 1.08 MHz while the 2 RBs have a UL bandwidth of 1.44 MHz. Accordingly, the UL bandwidth of the PRACH 702 is provided within 18 subcarrier spacings of the 24 subcarriers of the 2 RBs. In this example, the PRACH 702 is fixed to be provided in the same manner as in FIG. 5 at any value of the subcarrier spacing.

FIG. 7 illustrates the exemplary PRACH 702 within 9 subcarriers of each of the 2 RB and thus is provided within 18 subcarriers of a total of 24 subcarriers provided by the 2 RBs. In this example, the subcarrier spacing is equal to 60 kHz. Accordingly, the UL bandwidth of the PRACH 702 is equal to 1.44 MHz.

As shown in FIG. 7, the PRACH 702 has a resource allocation of RACH tones 704 so that 48 of the RACH tones 704 are provided for each of the 18 subcarriers of the 2 RBs. More specifically, the RACH tone spacing of the RACH tones 704 is 1.25 kHz. However, only a subset of the RACH tones 704 allocated to the PRACH 702 actually include a RACH preamble sequence 706. In this example, the RACH preamble sequence is provided by 839 of the RACH tones 704.

The UE 402 is configured to generate the RACH preamble sequence 706 so as to transmit the RACH preamble sequence 706 to the base station 404. The RACH preamble sequence 706 is provided for UL synchronization between the base station 404 and the UE 402, given a frame structure that provides RBs with the above mentioned bandwidth and with subcarriers described above. An allocation of guard tones 710 at the highest frequencies of the PRACH 702 and the allocation of guard tones 712 at the lowest frequencies of the PRACH 702 provide 25 of the guard tones 710, 712, like in FIG. 5. However, given the 60 kHz subcarrier spacing and the 1.25 kHz RACH tone spacing, a single subcarrier is 48 RACH tones. Consequently, 96 RACH tones are needed.

The total number of guard tones 710, 712 has not been provided so that the PRACH fits precisely into the 2 RBs. Thus, the determined number of RACH tones 704 allocated to the PRACH 702 is approximately equal to $12*N_{RB}*Ss/St$, where $N_{RB}$ is the number of RBs within the PRACH 702, the subcarrier spacing is Ss, and the RACH tone spacing is St. In this example, $N_{RB}$=1.5, Ss=60 kHz, and St=1.25 kHz. Therefore, 864 of the RACH tones 704 are provided in the PRACH 702.

As mentioned above, the sequence length of the RACH preamble sequence 706 is equal to 839, which is the number of RACH tones needed so that the UE 402 can select from 64 orthogonal Zadoff-Chu sequences and generate the RACH preamble sequence 706 during the RACH process. The PRACH formats above, however, presume that the frame structure of the frames have a subcarrier spacing like the implementation of FIG. 5.

In this case, the uplink data is punctured with the PRACH 702 and 48 additional RACH tones immediately adjacent to the highest and lowest frequencies of the PRACH 702. Thus, a total number of additional RACH tones x=96 are used for puncturing or rate matching the uplink data and providing enough spacing between the uplink data and the PRACH 702. Thus, the uplink data is rate matched or punctured by a total 20 subcarriers, the 18 subcarriers of the PRACH plus two additional subcarriers. Accordingly a total of 960 (i.e., 864+96) of RACH tone spacing of uplink data are rate matched or punctured. For even larger subcarrier spacing, the number of additional RACH tones x would be greater than 96 since more RACH tones are needed to cover a larger subcarrier spacing.

Figure 8:
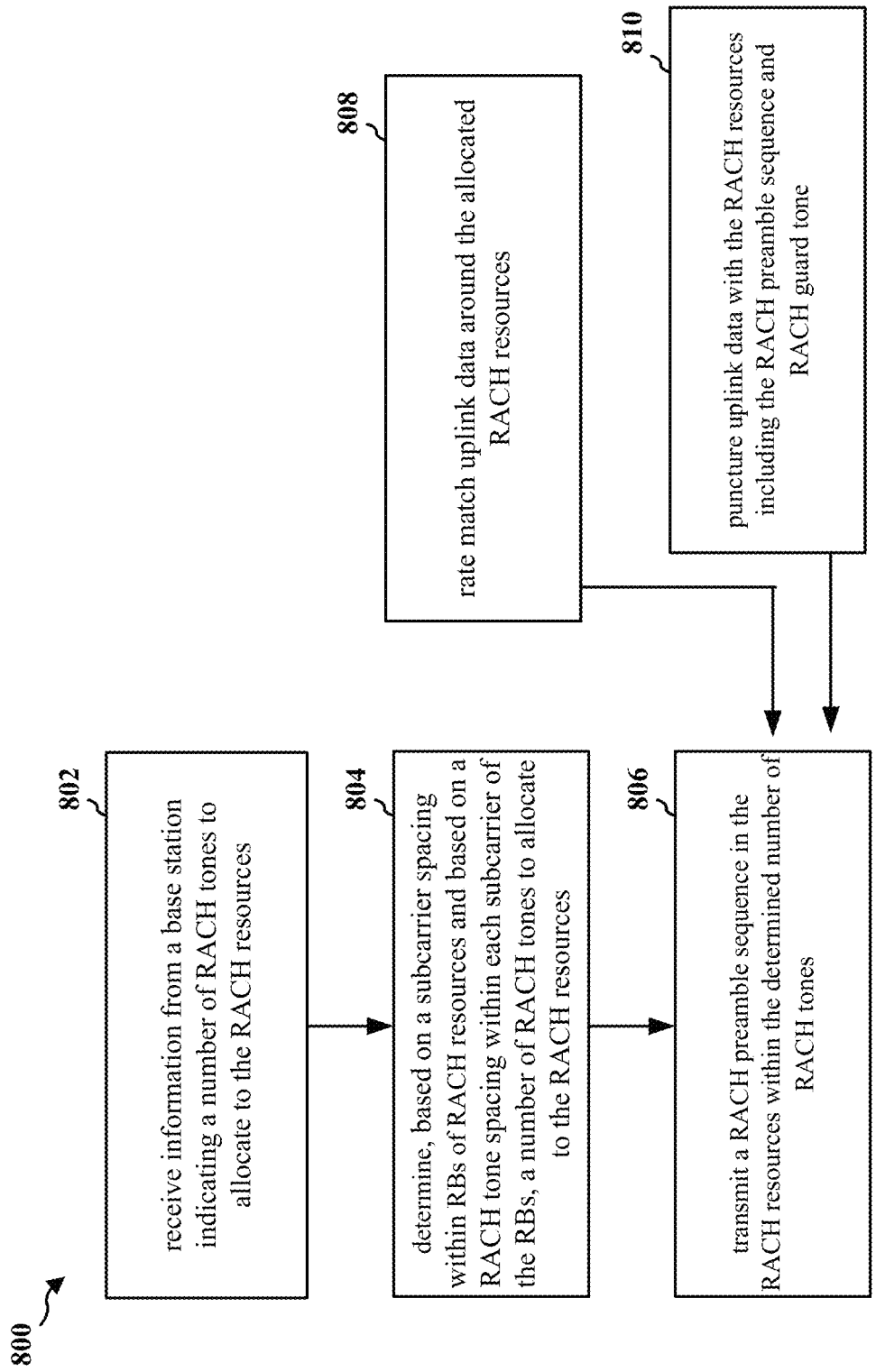
FIG. 8 is a flowchart of a method of wireless communication.

FIG. 8 is a flowchart 800 of a method of wireless communication. The method may be performed by a UE (e.g., UE 104, 350, 402, the apparatus 1002/1002', the apparatus 1202/1202'). At 802, the UE receives information from a base station indicating a number of RACH tones to allocate to the RACH resources. In one aspect, the information may be received through one or more of a PSS, a SSS, a PBCH, DMRS of the PBCH, RMSI, OSI, a PDCCH, a RRC message, a handover message, or SIB.

At 804, the UE may determine, based on a random access channel (RACH) subcarrier spacing and a data tone subcarrier spacing, a number of RACH tones allocated for a transmission of a RACH preamble sequence. The RACH preamble sequence length for the RACH preamble sequence (e.g., 839) may be fixed for various subcarrier spacings. In one aspect, the determined number of RACH tones is $N_1$ when the RACH subcarrier spacing is $S_1$ and is $N_2$ when the RACH subcarrier spacing is $S_2$, where $N_1>N_2$ and $S_1>S_2$. For example, $S_1$ may be equal to 60 kHz, $N_1$ may be equal to 1152, $S_2$ may be equal to 15 kHZ, and $N_2$ may be equal to 864. Furthermore, the RACH resources may include the RACH preamble sequence and RACH guard tones. The RACH guard tones comprise at least 6.5 subcarriers within the RBs of the RACH resources when the RACH subcarrier spacing is $S_1$ and comprise at least 2 subcarriers within the RBs of the RACH resources when the RACH subcarrier spacing is $S_2$. Also, in one aspect, the data tone subcarrier spacing is $S_s$ and the RACH tone spacing $S_t$, where $S_s>S_t$, and the determined number of RACH tones allocated for the RACH resources is approximately equal to $12*N_{RB}*S_s/S_t$, where $N_{RB}$ is the number of RBs within the allocated RACH resources and $N_{RB}≤5$ and is an integer. A number of guard tones within the RACH resources may increase as the RACH subcarrier spacing increases, where the number of guard tones being equal to the determined number of RACH tones minus the RACH preamble sequence length. For example, 25 RACH guard tones (i.e., 864-839) are provided for a RACH subcarrier spacing of 15 kHz and 313 RACH guard tones (i.e., 1152-839) are provided for a subcarrier spacing of 60 kHz, given a RACH tone spacing of 1.25 kHz.

At 806, the UE may transmit a RACH preamble sequence in the RACH resources within the determined number of RACH tones. In this manner, UE and the base station may be synchronized with the RACH preamble sequence. In order to provide additional guard tones, the UE may rate match uplink data around the allocated RACH resources at 808. The rate matched uplink data may be transmitted concurrently with the RACH preamble sequence. In another aspect, the UE may puncture uplink data with the RACH resources including the RACH preamble sequence and RACH guard tones at 810. The punctured uplink data may be transmitted concurrently with the RACH preamble sequence.

Figure 9:
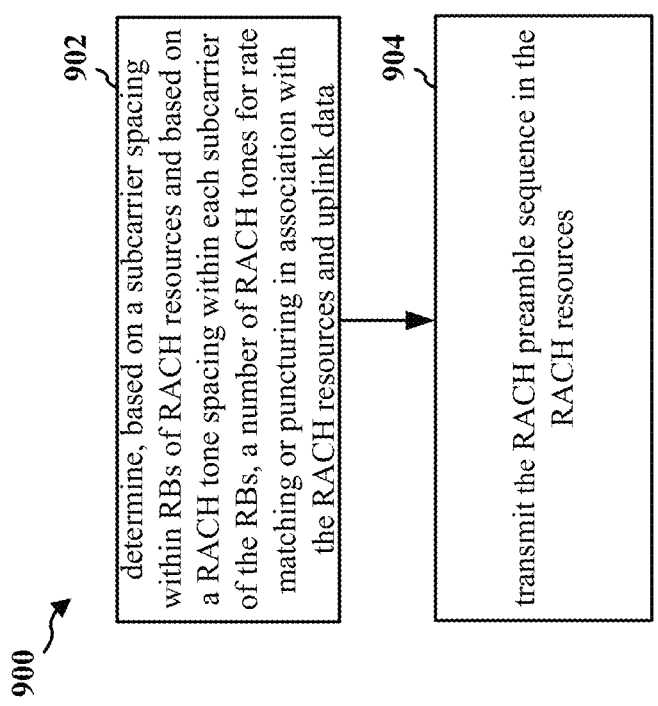
FIG. 9 is a flowchart of a method of wireless communication.

FIG. 9 is a flowchart 900 of a method of wireless communication. The method may be performed by a UE (e.g., UE 104, 350, 402, the apparatus 1002/1002', the apparatus 1202/1202').

At 902, the UE may determine, based on a subcarrier spacing within RBs of RACH resources and based on a RACH tone spacing within each subcarrier of the RBs, a number of RACH tones for rate matching or puncturing in association with the RACH resources and uplink data at 902. The number of RACH tones for rate matching or puncturing being equal to a number of RACH tones of the RACH resources plus x additional RACH tones, where x≥96 for a first subcarrier spacing $S_1$ and x=0 for a second subcarrier spacing $S_2$, where $S_1$ (e.g., 60 kHz)>$S_2$ (e.g., 15 kHz). In one aspect, the determined number of RACH tones for rate matching or puncturing is 960 for the first subcarrier spacing $S_1$ and is 864 for the second subcarrier spacing $S_2$. In another aspect, the RACH tone spacing is one of 1.25 kHz or 5 kHz, and the subcarrier spacing is one of 15 kHz or 60 kHz. The RACH preamble sequence length (e.g., 839) for the RACH preamble sequence is fixed for various subcarrier spacings.

At 904, the UE transmits the RACH preamble sequence in the RACH resources.

Figure 10:
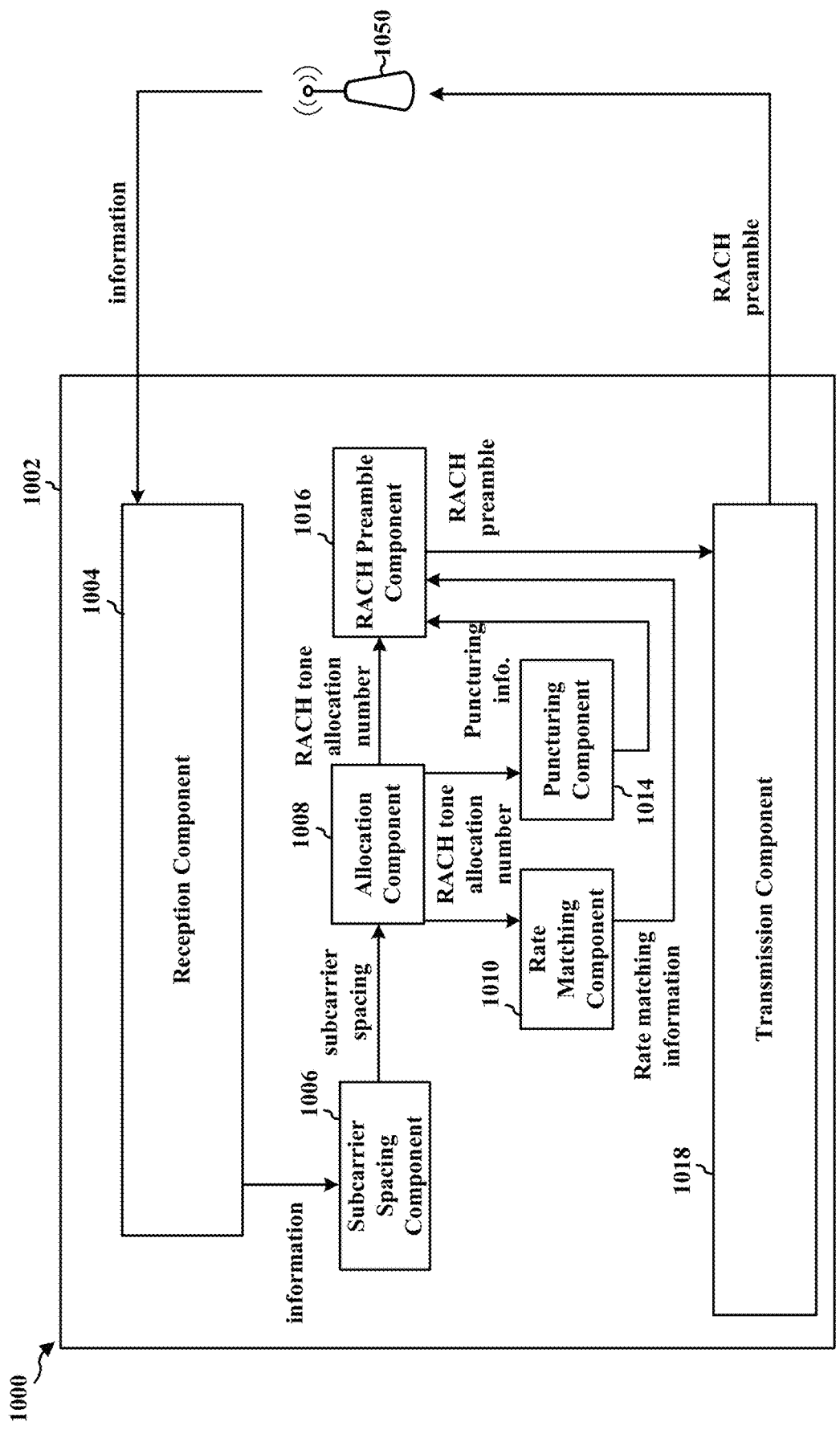
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., UE 104, 350, 402, the apparatus 1002', the apparatus 1202/1202') in communication with a base station 1050 (e.g., base station 102, 180, 310, 404, 1250). The apparatus may include a reception component 1004, a subcarrier spacing component 1006, allocation component 1008, rate matching component 1010, puncturing component 1012, RACH preamble component 1014, and/or a transmission component 1016.

The reception component 1004 may be configured to receive information from the base station 1050 indicating a number of RACH tones to allocate to the RACH resources. In one aspect, the information is received through one or more of a PSS, a SSS, a PBCH, DMRS of the PBCH, RMSI, OSI, a PDCCH, a RRC message, a handover message, or SIB. The reception component 1004 may be configured to send the information to the subcarrier spacing component 1006.

The subcarrier spacing component 1006 may be configured to determine a RACH subcarrier spacing or a data tone subcarrier spacing based at least in part on the information received from the base station 1050. The subcarrier spacing component 1006 may be configured to send information associated with the RACH subcarrier spacing and/or data tone subcarrier spacing to the allocation component 1008.

The allocation component 1008 may be configured to determine, based on a RACH subcarrier spacing and a data tone subcarrier spacing, a number of RACH tones allocated for a transmission of a RACH preamble sequence, e.g., as described above in additional detail with respect to operation 804 in FIG. 8. The allocation component 1008 may be configured to send information associated with the number of RACH tones allocated to the RACH resources to one or more of the rate matching component 1010, the puncturing component 1012, and/or the RACH preamble component 1014.

The rate matching component 1010 may be configured to rate match uplink data around the allocated RACH resources In order to provide additional guard tones. The rate matching component 1010 may be configured to send information associated with the rate matching to the RACH preamble component 1014.

The puncturing component 1012 may be configured to puncture uplink data with the RACH resources including the RACH preamble sequence and RACH guard tones. The puncturing component 1012 may be configured to send information and/or the punctured uplink data with RACH resources to the RACH preamble component 1014.

The RACH preamble component 1014 may be configured to generate a RACH preamble sequence based on the RACH tones allocated to the RACH resources, the rate matching, and/or the puncturing information. The RACH preamble component 1014 may be configured to send the RACH preamble to the transmission component 1016.

The transmission component 1016 may be configured to transmit a RACH preamble sequence in the RACH resources within the determined number of RACH tones to the base station 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
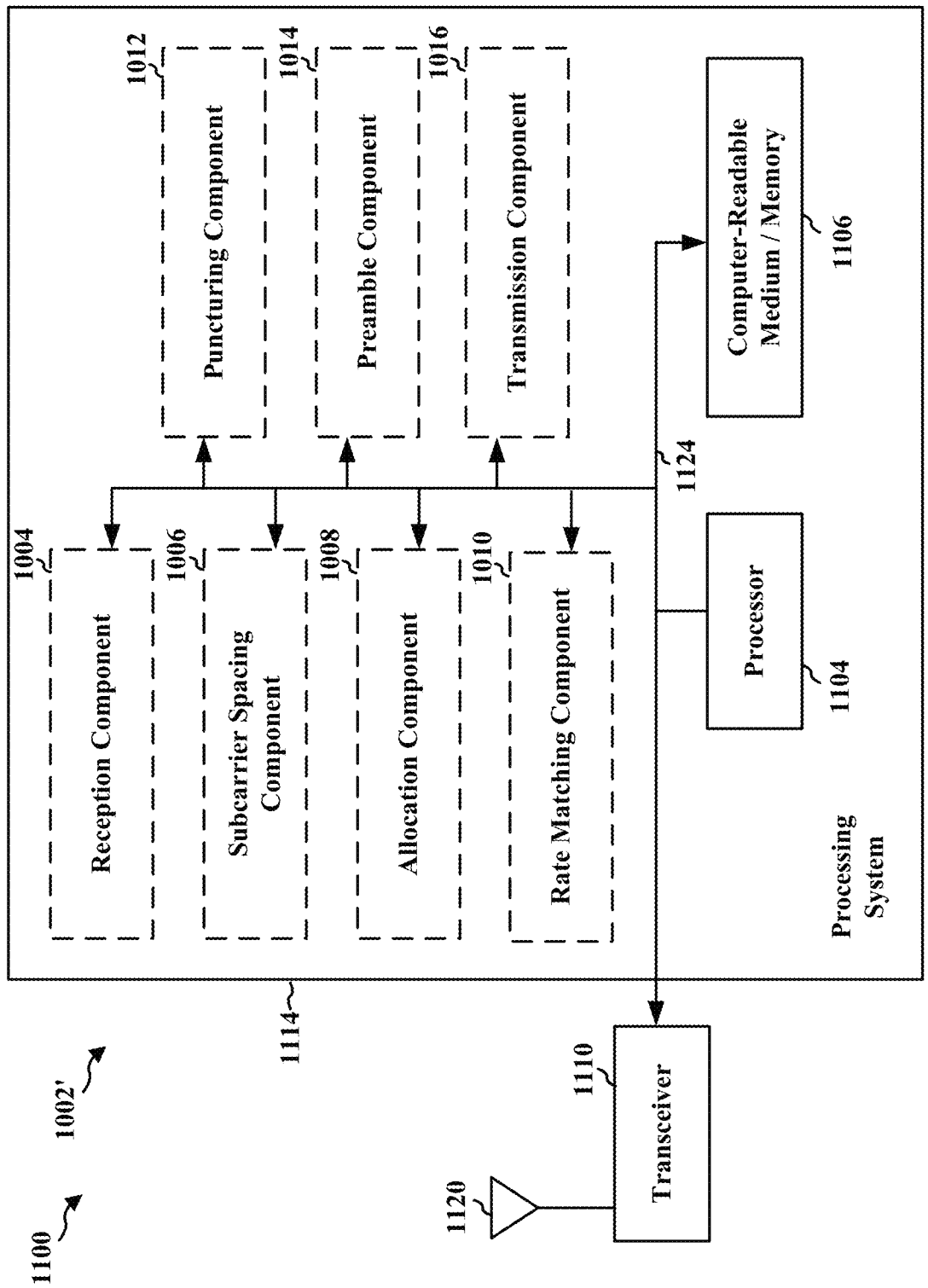
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1016, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016. The components may be software components running in the processor 1104, resident/stored in the computer readable medium/memory 1106, one or more hardware components coupled to the processor 1104, or some combination thereof. processing system 1114 may be a component of the UE 350 and may include the memory 360 and/or at least one of the TX processor 368, the RX processor 356, and the controller/processor 359.

In one configuration, the apparatus 1002/1002' for wireless communication may include means for receiving information from the base station 1050 indicating a number of RACH tones to allocate to the RACH resources. In one aspect, the information is received through one or more of a PSS, a SSS, a PBCH, DMRS of the PBCH, RMSI, OSI, a PDCCH, a RRC message, a handover message, or SIB. In certain other configurations, the apparatus 1002/1002' for wireless communication may include means for determining a RACH subcarrier spacing and/or data tone subcarrier spacing based at least in part on the information received from the base station. In certain other configurations, the apparatus 1002/1002' for wireless communication may include means for determining, based on a RACH subcarrier spacing and a data tone subcarrier spacing, a number of RACH tones allocated for a transmission of a RACH preamble sequence, e.g., as described above in additional detail with respect to operation 804 in FIG. 8. In certain other configurations, the apparatus 1002/1002' for wireless communication may include means for rate matching uplink data around the allocated RACH resources In order to provide additional guard tones. In certain other configurations, the apparatus 1002/1002' for wireless communication may include means for puncturing uplink data with the RACH resources including the RACH preamble sequence and RACH guard tones. In certain other configurations, the apparatus 1002/1002' for wireless communication may include means for generating a RACH preamble sequence based on the RACH tones allocated to the RACH resources, the rate matching, and/or the puncturing information. In certain other configurations, the apparatus 1002/1002' for wireless communication may include means for transmitting a RACH preamble sequence in the RACH resources within the determined number of RACH tones to the base station. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
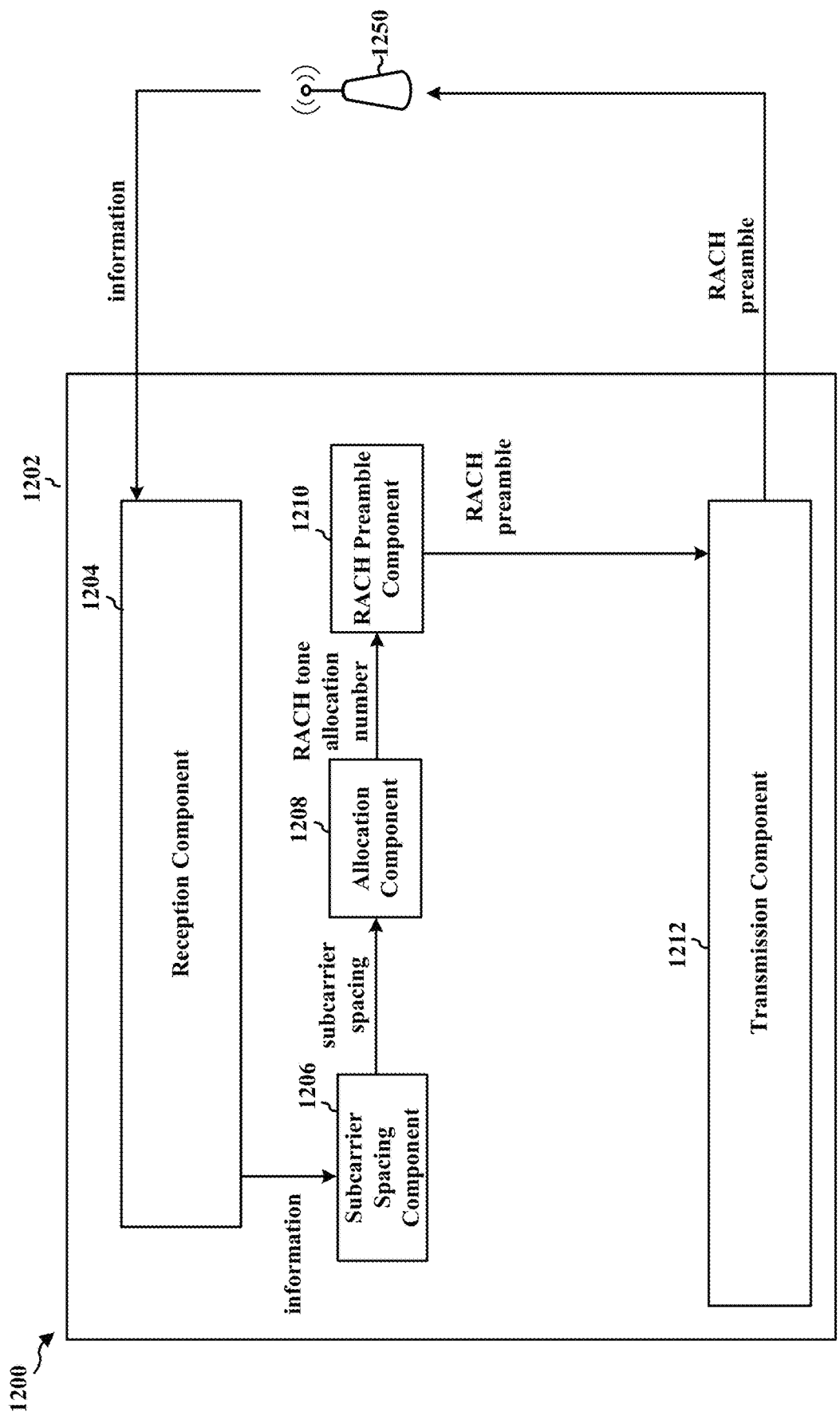
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE (e.g., UE 104, 350, 402, the apparatus 1002', the apparatus 1202/1202') in communication with a base station 1250 (e.g., base station 102, 180, 310, 404, 1050). The apparatus may include a reception component 1204, a subcarrier spacing component 1206, allocation component 1208, RACH preamble component 1210, and/or a transmission component 1212.

The reception component 1204 may be configured to receive information from the base station 1050 indicating a number of RACH tones to allocate to the RACH resources. In one aspect, the information is received through one or more of a PSS, a SSS, a PBCH, DMRS of the PBCH, RMSI, OSI, a PDCCH, a RRC message, a handover message, or SIB. The reception component 1204 may be configured to send the information to the subcarrier spacing component 1206.

The subcarrier spacing component 1206 may be configured to determine a subcarrier spacing based at least in part on the information received from the base station 1250. The subcarrier spacing component 1206 may be configured to send information associated with the subcarrier spacing to the allocation component 1208.

The allocation component 1208 may be configured to determine, based on a subcarrier spacing within RBs of RACH resources and based on a RACH tone spacing within each subcarrier of the RBs, a number of RACH tones to allocate to the RACH resources, e.g., as described above in additional detail with respect to operation 902 in FIG. 9. The allocation component 1208 may be configured to send information associated with the number of RACH tones allocated to the RACH resources to the RACH preamble component 1210.

The RACH preamble component 1210 may be configured to generate a RACH preamble sequence based on the RACH tones allocated to the RACH resources, the rate matching, and/or the puncturing information. The RACH preamble component 1210 may be configured to send the RACH preamble to the transmission component 1212.

The transmission component 1212 may be configured to transmit a RACH preamble sequence in the RACH resources within the determined number of RACH tones to the base station 1250.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
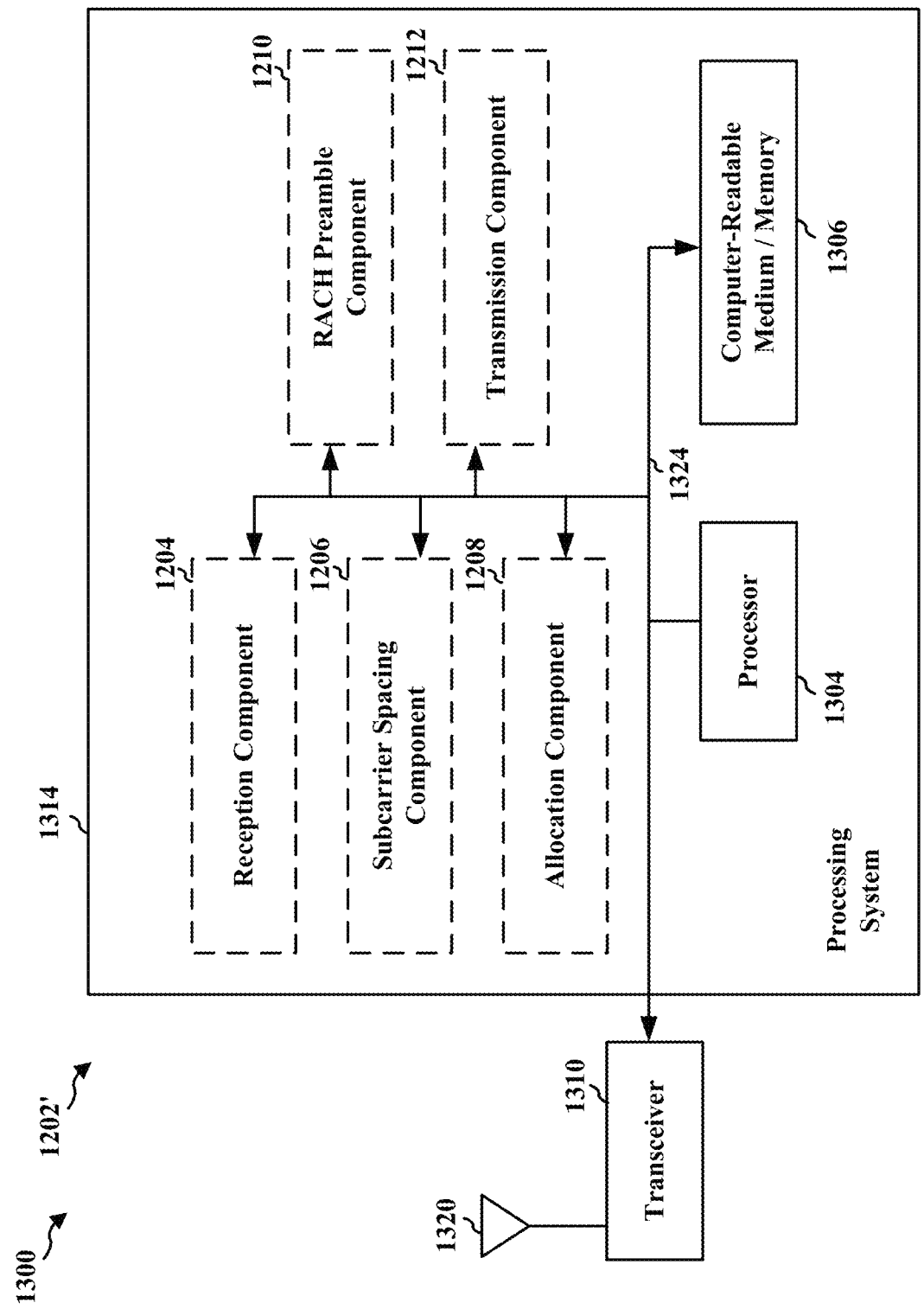
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication may include means for receiving information from the base station 1050 indicating a number of RACH tones to allocate to the RACH resources. In one aspect, the information is received through one or more of a PSS, a SSS, a PBCH, DMRS of the PBCH, RMSI, OSI, a PDCCH, a RRC message, a handover message, or SIB. In certain other configurations, the apparatus 1202/1202' for wireless communication may include means for determining a subcarrier spacing based at least in part on the information received from the base station. In certain other configurations, the apparatus 1202/1202' for wireless communication may include means for determining, based on a subcarrier spacing within RBs of RACH resources and based on a RACH tone spacing within each subcarrier of the RBs, a number of RACH tones to allocate to the RACH resources, e.g., as described above in additional detail with respect to operation 902 in FIG. 9. In certain other configurations, the apparatus 1202/1202' for wireless communication may include means for generating a RACH preamble sequence based on the RACH tones allocated to the RACH resources, the rate matching, and/or the puncturing information. In certain other configurations, the apparatus 1202/1202' for wireless communication may include means for transmitting a RACH preamble sequence in the RACH resources within the determined number of RACH tones to the base station. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Referring again to any of FIGS. 1-13, it should be noted that in some implementations, the above described steps may be performed by the base station (e.g., base station 102, 180, 310, 404, 1050, 1250) instead of the UE (e.g., UE 104, 350, 402, the apparatus 1002/1002', the apparatus 1202/1202'). In particular, the procedures taken above regarding the determination of the number of RACH tones given the RACH tone spacing and the subcarrier spacing may be pre-computed and provided as specific PRACH allocation in a table to the UE 104/402 from the base station (e.g., base station 102, 180, 310, 404, 1050, 1250). The base station (e.g., base station 102, 180, 310, 404, 1050, 1250) may then simply provide the table to the UE (e.g., UE 104, 350, 402, the apparatus 1002/1002', the apparatus 1202/1202') as part of the DL information and then the UE (e.g., UE 104, 350, 402, the apparatus 1002/1002', the apparatus 1202/1202') simply performs the proper puncturing or rate matching behavior in accordance with the pre-computed table.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining, based on a random access channel (RACH) subcarrier spacing and a data tone subcarrier spacing, a number of RACH tones allocated for a transmission of a RACH preamble sequence, wherein the RACH subcarrier spacing is one of a plurality of RACH subcarrier spacings and the data tone subcarrier spacing is one of a plurality of data tone subcarrier spacings, and the number of RACH tones allocated for a transmission of a RACH preamble sequence correspond to a ratio between the RACH subcarrier spacing and the data tone subcarrier spacing; and transmitting the RACH preamble sequence in RACH resources within the determined number of RACH tones.

2. The method of claim 1, wherein the RACH resources include the RACH preamble sequence and RACH guard tones.

3. The method of claim 2, wherein the RACH guard tones comprise at least 6.5 subcarriers within the RBs of the RACH resources when the subcarrier spacing is $S_1$ and comprise at least 2 subcarriers within the RBs of the RACH resources when the subcarrier spacing is $S_2$.

4. The method of claim 1, wherein the determined number of RACH tones is $N_1$ when the RACH subcarrier spacing is $S_1$ and is $N_2$ when the RACH subcarrier spacing is $S_2$, where $N_1 > N_2$ and $S_1 > S_2$.

5. The method of claim 1, wherein the data tone subcarrier spacing is $S_s$ and the RACH tone spacing $S_t$, where $S_s > S_t$, and the determined number of RACH tones allocated for the RACH resources is equal to $12*N_{RB}*S_s/S_t$, where $N_{RB}$ is the number of RBs within the allocated RACH resources and $N_{RB} \leq 5$ and is an integer.

6. The method of claim 1, further comprising rate matching uplink data around the allocated RACH resources, wherein the rate matched uplink data is transmitted concurrently with the RACH preamble sequence.

7. The method of claim 1, further comprising puncturing uplink data with the RACH resources including the RACH preamble sequence and RACH guard tones, wherein the punctured uplink data is transmitted concurrently with the RACH preamble sequence.

8. The method of claim 7, wherein a number of guard tones within the RACH resources increases as the RACH subcarrier spacing increases, the number of guard tones being equal to the determined number of RACH tones minus the RACH preamble sequence length.

9. The method of claim 1, wherein a RACH preamble sequence length for the RACH preamble sequence is fixed for various RACH subcarrier spacings.

10. The method of claim 1, further comprising receiving information from a base station indicating a number of RACH tones to allocate to the RACH resources.

11. The method of claim 10, wherein the information is received through one or more of a primary synchronization signal (PSS), a secondary synchronization signal (SSS), a physical broadcast channel (PBCH), demodulation reference signals (DMRS) of the PBCH, remaining minimum system information (RMSI), other system information (OSI), a physical downlink control channel (PDCCH), a radio resource control (RRC) message, a handover message, or a system information block (SIB).

12. A method of wireless communication of a user equipment (UE), comprising:
determining, based on a subcarrier spacing within resource blocks (RBs) of random access channel (RACH) resources and based on a RACH tone spacing within each subcarrier of the RBs, a number of RACH tones for rate matching or puncturing in association with the RACH resources and uplink data, the number of RACH tones for rate matching or puncturing being equal to a number of RACH tones of the RACH resources plus x additional RACH tones, where $x \geq 96$ for a first subcarrier spacing $S_1$ and x=0 for a second subcarrier spacing $S_2$, where $S_1 > S_2$; and
transmitting a RACH preamble sequence in the RACH resources.

13. The method of claim 12, wherein the determined number of RACH tones for rate matching or puncturing is 960 for the first subcarrier spacing $S_1$ and is 864 for the second subcarrier spacing $S_2$.

14. The method of claim 12, wherein the RACH tone spacing is one of 1.25 kHz or 5 kHz, and the subcarrier spacing is one of 15 kHz or 60 kHz.

15. The method of claim 12, wherein a RACH preamble sequence length for the RACH preamble sequence is fixed for various RACH subcarrier spacings.

16. An apparatus for wireless communication, comprising:
a memory; and
at least one processor coupled to the memory and configured to:
determine, based on a random access channel (RACH) subcarrier spacing and a data tone subcarrier spacing, a number of RACH tones allocated for a transmission of a RACH preamble sequence, wherein the RACH subcarrier spacing is one of a plurality of RACH subcarrier spacings and the data tone subcarrier spacing is one of a plurality of data tone subcarrier spacings, and the number of RACH tones allocated for a transmission of a RACH preamble sequence corresponds to a ratio between the RACH subcarrier spacing and the data tone subcarrier spacing; and
transmit the RACH preamble sequence in RACH resources within the determined number of RACH tones.

17. The apparatus of claim 16, wherein the RACH resources include the RACH preamble sequence and RACH guard tones.

18. The apparatus of claim 17, wherein the RACH guard tones comprise at least 6.5 subcarriers within the RBs of the RACH resources when the RACH subcarrier spacing is $S_1$ and comprise at least 2 subcarriers within the RBs of the RACH resources when the RACH subcarrier spacing is $S_2$.

19. The apparatus of claim 16, wherein the determined number of RACH tones is $N_1$ when the RACH subcarrier spacing is $S_1$ and is $N_2$ when the RACH subcarrier spacing is $S_2$, where $N_1 > N_2$ and $S_1 > S_2$.

20. The apparatus of claim 16, wherein the data tone subcarrier spacing is $S_s$ and the RACH tone spacing $S_t$, where $S_s > S_t$, and the determined number of RACH tones allocated for the RACH resources is equal to $12*N_{RB}*S_s/S_t$, where $N_{RB}$ is the number of RBs within the allocated RACH resources and $N_{RB} \leq 5$ and is an integer.

21. The apparatus of claim 16, further comprising rate matching uplink data around the allocated RACH resources, wherein the rate matched uplink data is transmitted concurrently with the RACH preamble sequence.

22. The apparatus of claim 16, wherein the at least one processor and memory are further configured to puncture uplink data with the RACH resources including the RACH preamble sequence and RACH guard tones, wherein the punctured uplink data is transmitted concurrently with the RACH preamble sequence.

23. The apparatus of claim 16, wherein a RACH preamble sequence length for the RACH preamble sequence is fixed for various RACH subcarrier spacings.

24. The apparatus of claim 23, wherein a number of guard tones within the RACH resources increases as the RACH subcarrier spacing increases, the number of guard tones being equal to the determined number of RACH tones minus the RACH preamble sequence length.

25. The apparatus of claim 16, wherein the at least one processor is further configured to receive information from a base station indicating a number of RACH tones to allocate to the RACH resources.

26. The apparatus of claim 25, wherein the information is received through one or more of a primary synchronization signal (PSS), a secondary synchronization signal (SSS), a physical broadcast channel (PBCH), demodulation reference signals (DMRS) of the PBCH, remaining minimum system information (RMSI), other system information (OSI), a physical downlink control channel (PDCCH), a radio resource control (RRC) message, a handover message, or a system information block (SIB).

27. A non-transitory computer-readable medium (CRM) storing computer executable code, comprising code to:
   determine, based on a random access channel (RACH) subcarrier spacing and a data tone subcarrier spacing, a number of RACH tones allocated for a transmission of a RACH preamble sequence, wherein the RACH subcarrier spacing is one of a plurality of RACH subcarrier spacings and the data tone subcarrier spacing is one of a plurality of data tone subcarrier spacings, and the number of RACH tones allocated for a transmission of a RACH preamble sequence corresponds to a ratio between the RACH subcarrier spacing and the data tone subcarrier spacing; and
   transmit the RACH preamble sequence in RACH resources within the determined number of RACH tones.

28. The non-transitory CRM of claim 27, wherein the RACH resources include the RACH preamble sequence and RACH guard tones.

29. The non-transitory CRM of claim 28, wherein the RACH guard tones comprise at least 6.5 subcarriers within the RBs of the RACH resources when the RACH subcarrier spacing is $S_1$ and comprise at least 2 subcarriers within the RBs of the RACH resources when the subcarrier spacing is $S_2$.

30. The non-transitory CRM of claim 27, wherein the determined number of RACH tones is $N_1$ when the RACH subcarrier spacing is $S_1$ and is $N_2$ when the RACH subcarrier spacing is $S_2$, where $N_1 > N_2$ and $S_1 > S_2$.

31. The non-transitory CRM of claim 27, wherein the data tone subcarrier spacing is $S_s$ and the RACH tone spacing $S_f$, where $S_s > S_f$, and the determined number of RACH tones allocated for the RACH resources is equal to $12*N_{RB}*S_s/S_f$, where $N_{RB}$ is the number of RBs within the allocated RACH resources and $N_{RB} \leq 5$ and is an integer.

32. The non-transitory CRM of claim 27, further comprising code to rate match uplink data around the allocated RACH resources, wherein the rate matched uplink data is transmitted concurrently with the RACH preamble sequence.

33. The non-transitory CRM of claim 27, further comprising code to puncture uplink data with the RACH resources including the RACH preamble sequence and RACH guard tones, wherein the punctured uplink data is transmitted concurrently with the RACH preamble sequence.

34. The non-transitory CRM of claim 27, wherein a RACH preamble sequence length for the RACH preamble sequence is fixed for various RACH subcarrier spacings.

35. The non-transitory CRM of claim 34, wherein a number of guard tones within the RACH resources increases as the RACH subcarrier spacing increases, the number of guard tones being equal to the determined number of RACH tones minus the RACH preamble sequence length.

36. The non-transitory CRM of claim 27, further comprising code to receive information from a base station indicating a number of RACH tones to allocate to the RACH resources.

37. The non-transitory CRM of claim 36, wherein the information is received through one or more of a primary synchronization signal (PSS), a secondary synchronization signal (SSS), a physical broadcast channel (PBCH), demodulation reference signals (DMRS) of the PBCH, remaining minimum system information (RMSI), other system information (OSI), a physical downlink control channel (PDCCH), a radio resource control (RRC) message, a handover message, or a system information block (SIB).

\* \* \* \* \*